Dec. 1, 1953  R. M. SNOW ET AL  2,661,218
OFFSET BORING HEAD
Filed April 17, 1950
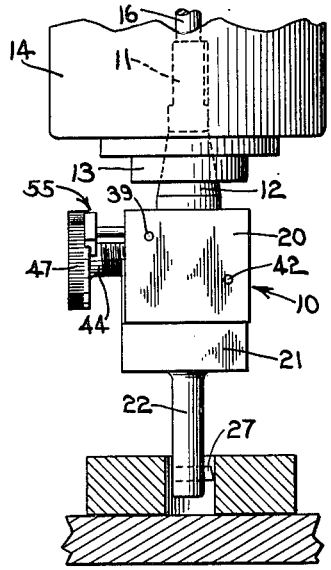
FIG. 1.
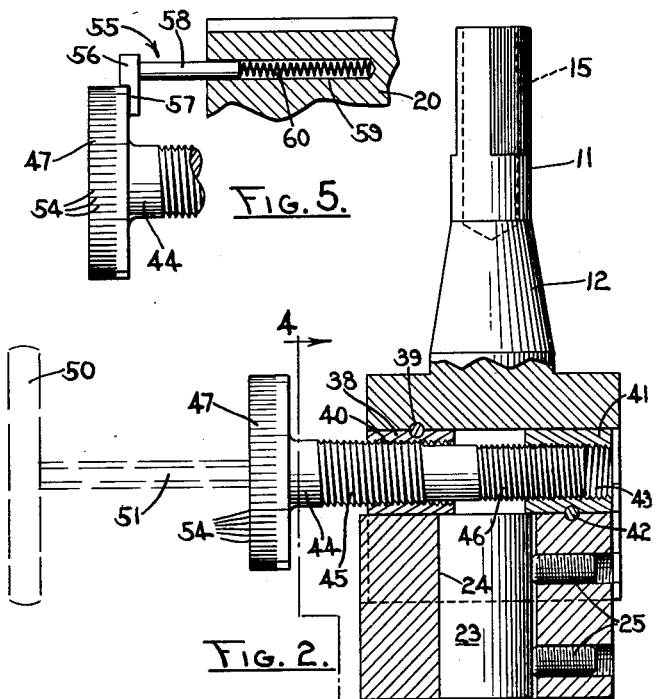
FIG. 5.
FIG. 2.
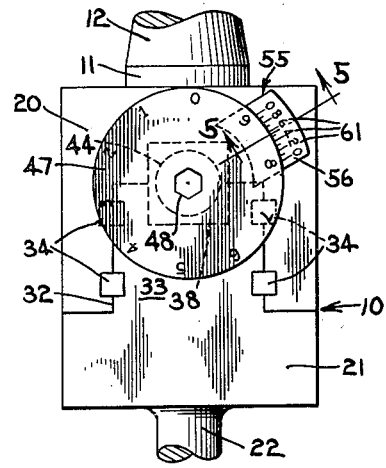
FIG. 3.
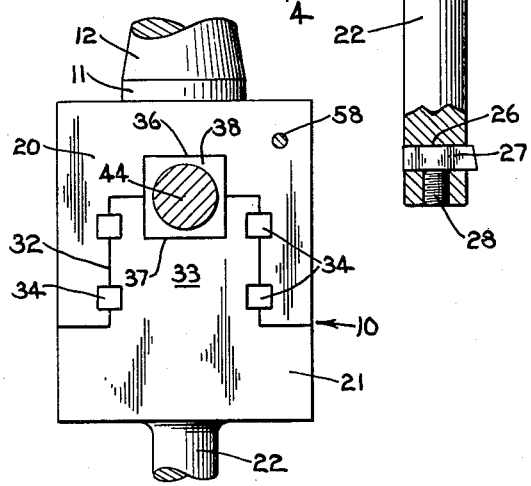
FIG. 4.
INVENTORS
RAYMOND M. SNOW
HERBERT RAY SNOW
BY Huebner, Beehler,
Worrel, Herzig & Caldwell
ATTORNEYS Patented Dec. 1, 1953

2,661,218

UNITED STATES PATENT OFFICE 2,661,218

OFFSET BORING HEAD

Raymond M. Snow and Herbert Ray Snow,
Fresno, Calif.

Application April 17, 1950, Serial No. 156,254

3 Claims. (Cl. 279—6)

This invention relates generally to metal working tools and more particularly to a micrometrically adjustable offset boring head.

In conventional boring heads for boring cylindrical openings in metallic work pieces, there has heretofore been no mechanical means for the accurate adjustment of the tool bit of the cutting tool in order to machine openings to precise measurements with minute tolerances. Conventional boring heads are slow and awkward to adjust. To obtain accurate cylindrical bores, the patience and time of a machinist are wasted and many rejections incurred by inaccuracies inherent in the employment of such heads. In most instances, to obtain a bore of accurate size, it is necessary for a machinist to use the cut and try method. He must "sneak up" on the size of the bore that is required by stopping the machining operation after each cut to measure the bore. It has been an unsolved problem of machinists, to bore openings to precise specifications quickly, easily and dependably, these attributes being incompatible in conventional boring heads.

It is an object of the present invention, therefore, to provide an improved boring head.

Another object is to provide a boring head in which the tool bit thereof is micrometrically eccentrically adjustable.

Another object is to provide a boring head in which the tool bit thereof is quickly and conveniently adjustable to eccentric boring positions and accurately traveled over ranges and/or in steps of precise adjustment.

Another object is to provide a boring head in which the tool bit thereof is positively retained in adjusted positions.

Further objects are to provide improved elements and arrangements thereof in a device of the character set forth that is durable, economical, dependable, and fully effective in its operation.

Still further objects and advantages will become apparent from the subsequent description in the specification.

In the drawing:

Fig. 1 is an elevational view of the boring head of the present invention attached to the spindle of a milling machine or boring machine, with the spindle supporting head of the machine being shown fragmentarily.

Fig. 2 is an enlarged vertical axial sectional view through the boring head.

Fig. 3 is a fragmentary elevational view of the boring head as seen from the control side thereof.

Fig. 4 is a fragmentary vertical sectional view through an adjustment screw of the boring head with the boring head seen as from line 4—4 in Fig. 2.

Fig. 5 is a fragmentary angular sectional view through the boring head, showing the spring loaded mounting of the vernier scale for the tool, as taken along line 5—5 in Fig. 3.

Referring in greater detail to the drawing:

The boring head of the present invention is indicated generally by the reference numeral 10 and is provided with an attaching shank 11 formed with a standard taper 12, such as a milling machine taper, as shown, so that it may be attached coaxially and internally of a spindle 13. The spindle is conventionally rotatably mounted in a head 14 of a vertical milling machine, boring machine, or like machine. The terminal end of the shank 11 is formed with an internally screw threaded coaxial draw bar opening 15 adapted threadedly to receive the threaded end of a draw bar 16 of the machine, to hold the shank inwardly of the spindle in securely assembled relation.

The boring head is provided with a block portion 20 formed integrally and preferably concentrically with the outer end of the shank 11. Another block 21 is supported on the block portion 20 and is adjustable thereon in a direction transversely to the axis of the shank 11 and thus to the axis of rotation. The adjustable block 21 supports a boring bar 22 in axially parallel relation to the shank 11 and integral block 20. The boring bar is attached to the block 21 by providing the boring bar with a coaxially located enlarged cylindrical head 23 which extends into a cylindrical opening 24 formed inwardly of the lower side of the block 21 in axially parallel relationship to the axis of rotation of the block portion 20 of the boring head. The cylindrical head 23 is securely located in the opening 24 as by a plurality of hexagon socket set screws 25 threadedly received through the block 21 and abutting the cylindrical head 23. For more dependable securing of the boring bar, the head 23 thereof is preferably flattened in a position for engagement by the set screws.

A rectangular opening 26 is formed diametrically through the boring bar 22 near its outer end which is adapted to receive a cutting tool bit 27 therein. The tool bit 27 may be a rectangular elongated piece of hardened tool steel, high speed steel, a tungsten carbide tipped tool bit, or of other suitable material and/or form. The tool bit is secured longitudinally in the rectangular opening 26 radially of the bar 22 by providing a hexagon socket set screw 28 threadedly received coaxially of the lower end of boring bar in holding engagement against one side of the tool bit 27. One end of the tool bit 27 extends exteriorly of the periphery of the boring bar and is ground with the proper clearance angles.

The block portion 20 and the block portion 21 of the boring head are connected for relative sliding movement so that the axis of the boring bar may be adjusted eccentrically of the axis of rotation of the block portion 20. This transverse adjustment is accomplished by forming the block portion 20 with a rectangular recess 32 extending transversely of the lower end thereof and by forming the block 21 with a complementarily shaped rectangular extension 33 transversely of its upper end with the recess 32 and the extension 33 in sliding engagement with each other. A plurality of jib bars 34 are located in juxtaposed recesses formed in adjacent longitudinal vertical faces of the recess 32 and the extension 33 so that the block portion 20 and the block 21 are held relatively axially parallel in sliding transverse engagement when the blocks are assembled as described and the jib bars inserted into place.

Means are provided for micrometrically adjusting the block 21 axially transversely of the block portion 20 by forming a rectangular recess 36 longitudinally of and upwardly extended from the recess 32 and by forming a rectangular recess 37 longitudinally in the upper end of the extension 33 with the recessed portion 36 and the recessed portion 37 in juxtaposed position forming a rectangular elongated opening intermediate and transversely of the block portion 20 and the block 21, all as shown in Fig. 4. A rectangular nut 38 of rectangular cross section is located with a close sliding fit within one end of the juxtaposed recesses 36 and 37 and is held in fixed longitudinal relation with the block portion 20 by means of a pin 39 extending through the block portion 20 and a portion of the nut. The nut 38 is provided with an internally threaded portion 40 which forms part of the micrometric adjustment of the boring bar. In the present instance the nut 38 is internally threaded with a so-called 20 pitch thread or with 20 threads per inch leaving a distance of .050 of an inch between each adjacent thread center. A second rectangular nut 41 of rectangular cross section is located within the juxtaposed recessed portions 36 and 37 in spaced relation to the nut 38. The nut 41 is held in fixed position longitudinally of the recessed portion 37 of the block 21 by means of a pin 42 extending through a portion of the nut 41 and through the block 21. The nut 41 is internally threaded coaxially of the threaded portion 40 of the nut 38 but of a smaller diameter for assembling convenience. In the present instance the threaded interior of the nut 41 is provided with a so-called 25 pitch thread having 25 threads to the inch and a distance of .040 of an inch between adjacent thread centers. Other thread rations may be employed in the nuts, as desired, but the suggested ratio achieves a convenient calibration, as presently described.

A screw 44 extends in threaded engagement through both of the nuts 38 and 41 with the screw having a larger diameter threaded portion 45 having "twenty" pitch threads threadedly engageable with the "twenty" pitch threads in the nut 38. A second portion 46 of the screw 44 is of smaller diameter and is provided with "twenty-five" threads which are threadedly engageable with the "twenty-five" pitch threads in the nut 41. Thus as the screw 44 is rotated in the nuts 38 and 41, the eccentrically adjustable block portion 21 is moved transversely axially relative to the fixed block portion 20 equal to the difference in distance of travel between the screw in the nut with "twenty-five" pitch threads and in the nut with the "twenty" pitch threads. The "twenty-five" pitch thread being .040 of an inch apart and the "twenty" pitch threads being .050 of an inch apart, the adjustable block 21 is moved .010 of an inch relative to the block 20 or the difference between .050 and .040 of an inch, on each complete revolution of the screw 44. It is obvious that the screw-threaded portions 45 and 46 are of the same direction of travel to achieve the desired microscopic travel of the bit 27 in response to rotation of the screw 44.

The screw 44 is provided with a radially extending cylindrical head 47 at one end with a hexagonal socket formed coaxially of its outer end whereby the screw may be conveniently turned by means of a T wrench shown in dash lines at 50. The T wrench 50 is provided with a hexagonal shank 51, the end of which is receivable in the hexagonal socket 43 for driving connection.

The cylindrical face of the cylindrical head 47 of the screw 44 is calibrated, as at 54, into ten equally divided portions and each one-tenth is divided into ten equal divisions. Thus each subdivision of the calibrations on the cylindrical head 47 is one-hundredth of the complete cylindrical surface. Each subdivision of the calibrations 54 of the cylindrical head 47 represents one-hundredth of the complete cylindrical surface and also indicates one-hundredth of one whole revolution of the screw 44 or one-hundredth of ten thousandths of an inch. This equals .0001 inch of movement of the eccentrically adjustable block 21 relative to the fixed block portion 20 on rotation of the screw one graduation on the cylindrical head.

A vernier 55 is provided to subdivide further the calibrations for the adjustment of the screw 44. The vernier comprises a substantially rectangular block 56 which is recessed at 57 in one face thereof to a portion of a cylinder having a radius equal to the radius of the cylindrical head 57. A rod 58 is secured to and extends normal to the block 56 and is slidably received in a cylindrical opening 59 formed axially parallel to the screw 44 in the fixed block portion 20. A helical compression spring 60 is located under initial compression in the cylindrical opening 60 between the bottom end thereof and the inner end of the rod 58. Thus the vernier 55 is constantly urged axially outwardly, which maintains the block 56 and the recessed portion 57 thereof in contact with the periphery and inner end of the cylindrical head 47 of the screw 44 as the screw is fed inwardly or outwardly. Vernier calibrations 61 are formed in the outer face of the block 56 being spaced apart to any spacing suitable to vernier function. Thus by use of the vernier, each of the one-eightieth subdivisions of the cylindrical head 74 is further divided into smaller increments which permit an adjustment of the adjustable block portion 21 relative to the fixed block portion 20 to micrometric amounts.

The relatively sliding surfaces between the axially fixed block portion 20 and the eccentrically adjustable block portion 21 are machined as accurately and with a minimum of tolerance so that there is a minimum of play between the relatively adjustable blocks. The tolerances between the relatively sliding portions are substantially that of a press fit so that the blocks resist relative sliding motion therebetween and thereby substantially eliminate all play between the blocks. The threaded portions of the screw 44 and of the nuts 38 and 41 are formed of a so-called class 4 or close tolerance type of screw thread so that there is a minimum of axial play between the screw threaded relatively movable parts. The total amount of end play between the screw 44 and the nuts 38 and 41 is approximately .010 of an inch. Some longitudinal tolerance is necessary and this slight play is not objectionable, in that as long as the tool bit is fed radially outwardly of the axis of the boring head for feed into a work piece no back lash takes place in the accurate positioning of the tool bit.

*Operation*

The operation and utility of the present invention is believed to be apparent from the foregoing description and is briefly summarized at this point. In the use of the boring head of the present invention, the tapered shank 11 of the tool is inserted into the rotatable spindle of a milling machine or the like and the drawbar of the machine threadedly engaged with the shank so that the tool is held rigidly coaxially of the spindle. A properly ground tool bit 27 is attached in the boring bar 22 and extended slightly from the periphery thereof. The eccentrically adjustable block portion 21 is radially adjusted relative to the block portion 20 so that the cutting point of the tool bit is rotated at approximately the size of the hole to be bored in a work piece. This adjustment is accomplished by rotating the screw 44 by means of head 47 or the T wrench 50 with the screw 44 rotating in the nuts 38 and 41. On each complete revolution of the screw 44, the adjustable block portion 21 is moved eccentrically to the block portion 20 to the extent of .010 of an inch. More minute adjustments are achieved by visual reference to the graduations 54 and the vernier 56.

From the foregoing description it is apparent that the present invention provides an improved boring head in which the tool bit thereof is micrometrically adjustable for boring openings to precise size. The boring head is quickly and easily adjustable to accurate dimensions in the provision of the easily read vernier calibrations in connection with the calibrations of the head 47. The boring head is a long sought innovation in the art of machine tools and fills a long existing need.

Although we have herein shown and described our invention in what we have conceived to be the most practical and preferred embodiment, it is recognized that departures may be made therefrom within the scope of the invention, which is not to be limited to the details disclosed herein, but is to be accorded the full scope of the claims so as to embrace any and all equivalent devices and structures.

Having described our invention, what we claim as new and desire to secure by Letters Patent is:

1. An adjustable tool holder comprising a mounting block adapted to be supported and rotated coaxially of a rotatable spindle, an adjustable block slideably supported on the fixed block for positioning radially, of the axis of rotation, a radially extending screw threadedly engaged with one of the blocks with screw threads of one pitch and threadedly engaged with the other block with threads of a different pitch, the screw having an enlarged cylindrical head at one end exteriorly of the blocks calibrated on its periphery, a vernier block slidcably supported on the fixed block axially parallel to the axis of the screw, and means for urging the vernier block outwardly into constant engagement with the enlarged head of the screw.

2. An adjustable tool holder comprising a fixed block having a shank adapted to be attached in a rotatable spindle for coaxial rotation therewith and having a radially extended guide way formed therein, a radially adjustable block having a complementarily shaped radially extended guide receivable in the guide way of the fixed block, means securing the blocks in slidable assembly with the guide in the guide way, a nut secured to one of the blocks having axially radially extending screw threads, a nut attached to the other block having screw threads of another pitch in axial alignment with the screw threads of the first mentioned nut, a screw threadedly received in both of the nuts having threaded portions of pitch corresponding to that of the nuts, the screw having an enlarged cylindrical head externally of the blocks calibrated on its periphery, one of said blocks having a bore formed therein axially parallel to the screw, a vernier positioned against the head of the screw having a rod portion slidably fitted to the bore, and resilient means within the bore urging the vernier outwardly into engagement with the head.

3. An adjustable tool holder comprising a mounting shank, a block rigidly mounted on the shank and having a groove formed therein in transverse relation to the shank, a second block slidably fitted against the first block having an extension complementary to the groove of the first block slidably fitted in said groove, the extension and the first block adjacent to the groove having juxtaposed elongated recesses formed therein, elongated jib bars located in the juxtaposed recesses and mounting the second block on the first block for relative slidable movement, the first block having an elongated channel formed therein adjacent to the second block and the second block having an elongated channel in facing relation thereto, a pair of nuts mounted in the facing channels at opposite sides of the blocks, one thereof being secured to the first block and the other to the second block, said nuts having aligned screw threaded openings formed therethrough with threads of different pitch but of the same direction, one of said openings being appreciably larger than the other, and a screw member extended through the nut with the larger opening and into the other nut and screw threadedly engaged with said nuts.

RAYMOND M. SNOW.
HERBERT RAY SNOW.

References Cited in the file of this patent

UNITED STATES PATENTS

| Number | Name | Date |
|---|---|---|
| 335,110 | Clifford et al. | Feb. 2, 1886 |
| 892,894 | Roman | July 7, 1908 |
| 973,542 | Muehlmatt | Oct. 25, 1910 |
| 2,125,005 | Jearum | July 26, 1938 |